United States Patent [19]

Pologe et al.

[11] Patent Number: 5,790,729
[45] Date of Patent: Aug. 4, 1998

[54] PHOTOPLETHYSMOGRAPHIC INSTRUMENT HAVING AN INTEGRATED MULTIMODE OPTICAL COUPLER DEVICE

[75] Inventors: Jonas A. Pologe; Shao Yang, both of Boulder, Colo.

[73] Assignee: Ohmeda Inc., Liberty Corner, N.J.

[21] Appl. No.: 631,314

[22] Filed: Apr. 10, 1996

[51] Int. Cl.$^6$ ........................................ G02B 6/26
[52] U.S. Cl. ........................ 385/46; 385/31; 385/45; 385/20
[58] Field of Search ................. 385/46, 49, 22, 385/45, 31, 21, 20, 42, 48

[56] References Cited

U.S. PATENT DOCUMENTS

| | | | |
|---|---|---|---|
| 4,447,116 | 5/1984 | King et al. | 350/96.13 |
| 4,515,430 | 5/1985 | Johnson | 350/96.13 |
| 4,991,926 | 2/1991 | Pavlath | 350/96.15 |
| 5,082,342 | 1/1992 | Wight et al. | 385/8 |
| 5,159,420 | 10/1992 | Grudkowski et al. | 357/30 |
| 5,166,766 | 11/1992 | Grudkowski et al. | 257/15 |
| 5,220,573 | 6/1993 | Sakata et al. | 372/50 |
| 5,319,727 | 6/1994 | Ford et al. | 385/30 |
| 5,394,489 | 2/1995 | Koch | 385/46 X |

OTHER PUBLICATIONS

Technology and Application Update for Polyguide™-... May 24, 1995.

Polo-Parallel Optical Links for Gigabyte Data Communications Kenneth H. Hahn, date unknown (referenced in May 24, 1995 article above).

Optical Waveguide Circuit Board with a Surface-Mounted Optical Receiver Array Thomson et al. A reprint from Optical Engineering Mar. 1994.

Polyguide™ technology for passive optical interconnects Marchegiano et al. OE/Lase '96 Conference Jan. 27–Feb. 2, 1996.

Recent developments in polymer waveguide technology and applications for data link and optical interconnect systems Bruce L. Booth OE/Lase '96 Conference Jan. 27–Feb. 2, 1996.

Polymers for Integrated Optical Waveguides Bruce L. Booth Polymers for Electronic and Photonic Applications 1993 no month.

Primary Examiner—Phan T. H. Palmer
Attorney, Agent, or Firm—William A. Schoneman; Roger M. Rathbun; Salvatore P. Pace

[57] ABSTRACT

The integrated multimode optical coupling apparatus comprises an N-to-M optical coupling arrangement that is simple to manufacture, minimizes optical losses and is significantly less expensive than the prior art arrangements of coupling optical signals. The preferred embodiment of the apparatus of the present invention comprises a substrate into which is formed a plurality of optical channels, each of which is joined at one end into a single output optical channel. This integrated optical coupler is formed by diffusing silver ions or other equivalent ions into the glass substrate in these defined areas to form channels of high optical refractive index in the body of the substrate. At one end of each of the optical channels that are formed in the substrate, the plurality of the optical channels are joined together in a volumetric region of the substrate wherein the individual channels merge into one unified common structure. The output optical channels are joined to this combiner to thereby carry the combined light output to the output terminals. One application of this apparatus is in the field of photoplethysmography, such as in a pulse oximeter instrument.

10 Claims, 6 Drawing Sheets

PHOTOPLETHYSMOGRAPHIC INSTRUMENT HAVING AN INTEGRATED MULTIMODE OPTICAL COUPLER DEVICE

FIELD OF THE INVENTION

This invention relates to optical systems and, in particular, to an optical coupler formed on a substrate to support multiple modes of excitation and which functions to couple the output signals from a plurality of light emitting devices into at least one output optical channel.

PROBLEM

It is a problem in the field of optical devices to efficiently and simply couple the light generated by these optical devices into an output optical channel. The problem is exacerbated when the light generated by a plurality of light sources must be joined together into a common optical channel.

Existing light coupling elements typically comprise connectorized optical fibers and optical fiber mounts. In a typical application, a single optical fiber is terminated in an optical fiber connector which can then be mechanically interconnected with another optical fiber connector to terminate the optical fiber with either a light emitting device or an output channel (such as another optical fiber). There are numerous designs of these connectors and each functions in its own particular way to physically secure the optical fiber to the optical fiber connector and orient, to varying degrees of precision, the optical fiber within the optical path formed by the optical fiber connectors.

In the instance where a plurality of light sources must be interconnected with a single optical channel, the mechanical interconnection and alignment of the optical elements becomes significantly more complex. In an N-to-1 coupling situation, the light beams produced by a plurality of light emitting devices must be coupled into a single optical channel. The physical dimensions of the light emitting devices limit the spacing between the light beams that are produced by the light emitting devices such that physically juxtaposing a plurality of light emitting devices would result in the light beams being produced in an area that is of extent greater than the optical cross-section of an optical fiber that can practicably be used to implement the output optical channel.

Thus, the problem of interconnecting a plurality of light beams, produced by a like plurality of light emitting devices, distills to the need to direct the plurality of light beams into an area that is less than or equal to the optical cross-section of the optical fiber that is used to implement the output optical channel. This is typically accomplished by the use of a plurality of connectorized optical fibers configured into an N-to-1 concentrator. In practice, the output optical channel comprises a fairly large diameter optical fiber to which is joined a plurality of small diameter optical fibers such that the cut ends of the large diameter and small diameter optical fibers are physically butted together so that their optical cross-sections match. The distal end of each of the small diameter optical fibers joined in this manner is either terminated in an optical fiber connector so that this optical fiber connector can be joined to an optical fiber connector that is affixed to the output of the light emitting device or directly butt coupled to the light emitting device. Alternatively, the small diameter optical fibers are positioned opposite a lens which receives the light beams generated by a corresponding one of the light emitting devices and focuses the light beams into the end of the small diameter optical fibers.

It is obvious that such an arrangement requires an extensive amount of precision manufacturing and is subject to loss of light intensity due to imprecise alignments and foreign matter that interferes with the optical transmissivity of the elements. Therefore, existing N-to-1 optical coupling arrangements tend to be fairly expensive and suffer from a significant amount of optical loss. The N-to-M optical coupling problem is even more complex and suffers from the additional need to terminate the merged input optical channels in multiple output channels.

SOLUTION

The above described problems are solved and a technical advance is achieved in the field by the integrated multimode optical coupling apparatus of the present invention. This apparatus comprises an N-to-M optical coupling arrangement that is simple to manufacture, minimizes optical losses and is significantly less expensive than the prior art arrangements of coupling optical signals. The preferred embodiment of the apparatus of the present invention comprises a substrate into which is formed a plurality of optical channels, each of which is joined at one end with other optical channels to merge the input channels and direct the light carried therein into at least one output optical channel.

This integrated optical coupler is formed by applying a mask to a major surface of a glass substrate, which mask defines the physical dimensions of the optical channels in the plane of this surface of the substrate. Silver ions or other equivalent ions are diffused into the glass substrate in these defined areas to form channels of high optical refractive index in the body of the substrate. The physical extent of these optical channels in a plane parallel to this surface of the substrate corresponds to the pattern of the mask that was formed thereon. The depth of the optical channels is a function of the processing steps and can be controlled with precision. The optical channels that are formed are substantially rectangular (with rounded edges) in optical cross-section along the length of the optical channel. At one end of each of the optical channels that are formed in the substrate, the plurality of the optical channels are joined together in a volumetric region of the substrate wherein the individual channels merge into one unified common structure.

By forming the optical channels in the substrate, the radius of curvature, the cross-section of the channels, the optical transmissivity, and position of the optical channels with respect to each other can be precisely controlled. In addition, the dimensions and positioning of the optical channels can be selected such that they match the particular positioning of the light emitting devices to thereby eliminate the need for lenses to focus the optical beams that are produced by the light emitting devices. Furthermore, connectors can be dispensed with since the light emitting devices can be juxtaposed to the corresponding optical channel of the substrate without the need for connectors or any other complex mechanical interconnect apparatus.

The integrated multimode optical coupler apparatus is configured to support the transmission of multiple modes of excitation in the optical channels. In particular, the dimensions of the optical channels are selected to maximize the coupling efficiency with ample tolerance. The numerical aperture of the resultant waveguide, formed by the optical channel, is also designed to maximize the coupling. Waveguides of this size and numerical aperture support multiple modes of excitation.

The integrated multimode optical coupler of the present invention is significantly smaller in size than prior optical coupling arrangements, has a significantly reduced cost over these prior art configurations, and provides the designer with precise control over numerous physical characteristics to thereby fine tune the optical transmissivity and any other characteristics of the optical channels. This apparatus is particularly useful in the field of photoplethysmography. In particular, in a pulse oximeter instrument there is a need to combine the optical signals produced by two or more light sources into a single beam which is directed at the tissue under test. The integrated multimode optical coupler enables the pulse oximeter instrument to efficiently combine the optical signals and transmit the resultant single beam via a single optical fiber.

DETAILED DESCRIPTION

Figure 1A:
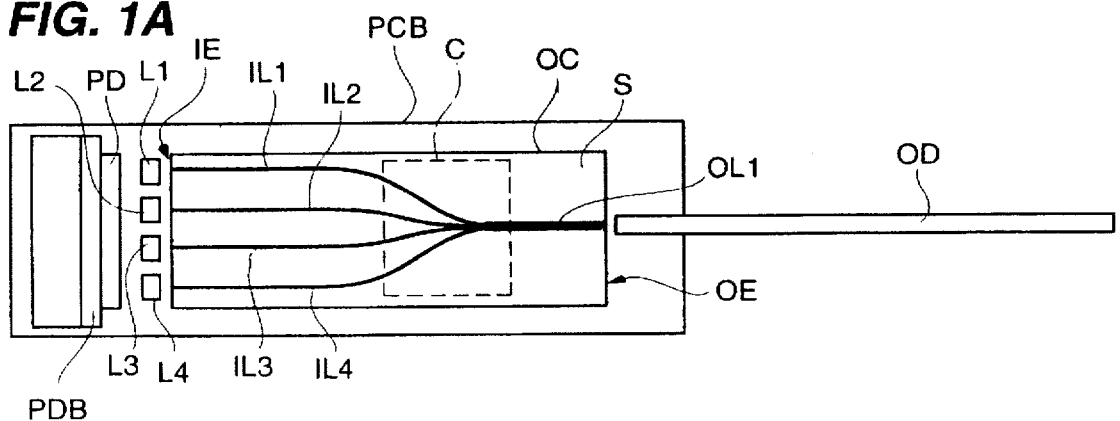
FIGS. 1A–1C illustrate a top plan view, a side view and a cross-section input end view, respectively, of the preferred embodiment of the integrated multimode optical coupler of the present invention.
Figure 1B:
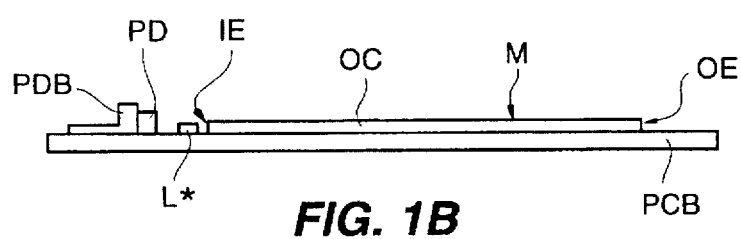
Figure 1C:
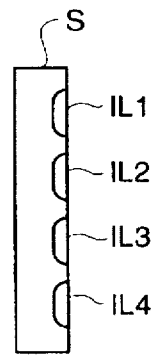

FIG. 1A illustrates a top plan view, FIG. 1B illustrates a side view and FIG. 1C illustrates a cross-section input end view of the preferred embodiment of the integrated multimode optical coupler OC of the present invention wherein a plurality of light emitting devices L1–L4 (termed L* in FIG. 1B) are coupled by the integrated multimode optical coupler OC to a single optical output channel OD. The illustration of FIG. 1B has the output optical fiber OD absent therefrom in the interest of clarity of illustration. The integrated multimode optical coupler OC comprises a substantially rectangular block of substrate material S into which are formed the optical channels and apparatus of the preferred embodiment of the present invention. For the purpose of illustrating the concepts of this invention, the input optical channels IL1–IL4 are aligned to terminate (exit) at a single face (edge) IE of the substrate S while a single output optical channel OL1 is shown as aligned to terminate (exit) a single face (edge) OE of the substrate S, which face OE is distal from the face IE on which the input optical channels IL1–IL4 terminate. It is obvious that other orientations of the input and output optical channels IL1–IL4, OL1 and other geometries of the substrate S can be fabricated, with the specific implementation being a function of the requirements of the system in which the apparatus of the present invention is installed.

The plurality of light emitting devices L1–L4 can comprise laser diodes or light emitting diodes, each of which is activated by control circuitry (not shown) to produce a beam of light in conventional fashion. The operation of the light emitting devices L1–L4 is typically pulsed and time-division multiplexed. The light emitting devices L1–L4 are oriented so that the light beams generated by each of the light emitting devices L1–L4 is transmitted to a predefined point on a selected edge IE of the integrated multimode optical coupler OC. While a linear array of N (N=4) light emitting devices L1–L4 is shown in FIG. 1A, other orientations are possible, such as orienting the light emitting devices L1–L4 along two or more edges of the integrated multimode optical coupler OC. Juxtaposed to another edge OE of the integrated multimode optical coupler OC is an optical output device OD which receives light output by the integrated multimode optical coupler OC and transmits this light to a predetermined destination. The output device OD is typically a length of optical fiber, which is shown herein for the purpose of illustration.

In the application illustrated in FIGS. 1A–1C, the light emitting devices L1–L4 are, for the purpose of illustration, laser diodes. In standard edge emitting laser diodes, an integral photo diode is typically formed in the same package as the laser diode during the manufacturing process. The laser diode emits light in both the forward and backward directions, from each end facet of the laser cavity. The majority of the light generated by the laser diode in the laser cavity is emitted in the forward direction while the remainder of the generated light is emitted in the backward direction so that it is incident on the integral photo diode. The output of the integral photo diode is used in a feedback circuit to stabilize and control the light output of the laser diode.

In the embodiment of FIG. 1A, the integral photo diode of the laser diodes is shown as replaced by the single external photo diode PD, affixed to mounting bracket PDB. The photo diode PD is of physical dimensions to encompass the plurality of light emitting devices (laser diodes) L1–L4, each of which emits the above-noted portion of the light generated in the laser cavity in the backward direction, to impinge on photo diode PD. The substrate PCB on which the integrated multimode optical coupler OC, light emitting devices L1–L4, optical fiber OD, photo diode PD and various mounting apparatus PDB are attached can itself be a circuit board. As such, the circuit board PCB includes the bonding pads, and die bond pads necessary for mounting and positioning the optical fiber OD and the integrated multimode optical coupler OC itself.

Optical Coupler Structure

The integrated multimode optical coupler OC in the preferred embodiment of the invention comprises a substantially rectangular substrate having a first major surface into which are formed a plurality of optical channels. These optical channels include a plurality of input optical channels IL1–IL4, each of which has a first end adapted to receive a light beam that is transmitted by one of the light emitting devices L1–L4 to the integrated multimode optical coupler OC. A second end of each of the input optical channels IL1–IL4 is located at a point internal to the integrated multimode optical coupler OC, which point is part of the apparatus termed herein an optical combiner C, where a plurality of the input optical channels IL1–IL4 are joined together into one or more output optical channels OL1. The plurality of light emitting devices L1–L4 are typically mounted in some mechanical manner to a base so that the position, orientation and spacing of the light emitting devices L1–L4 can be precisely controlled. For example, the light emitting devices L1–L4 can be mounted on a printed circuit board PCB. In order to optimize the optical coupling efficiency, it is preferable in the preferred embodiment of the invention to place the light emitting devices L1–L4 close together in order to minimize the separation between the various light beams produced by the light emitting devices L1–L4 (without producing crosstalk) and as close to the individual input optical channels IL1–IL4 as possible. A linear array of the light emitting devices L1–L4 is shown in FIG. 1A for this purpose. The integrated optical coupler OC is fabricated such that the plurality of input optical channels IL1–IL4 are oriented to correspond to the placement of the light emitting devices L1–L4, with each light emitting device L1–L4 physically juxtaposed to a corresponding one of the input optical channels IL1–IL4 when the integrated multimode optical coupler OC is, for example, mounted on the printed circuit board PCB juxtaposed to the plurality of light emitting devices L1–L4. In this configuration, the light beam produced by each of the light emitting devices L1–L4 is transmitted a short distance to the receiving face of a corresponding one of the input optical channels IL1–IL4 of the integrated multimode optical coupler OC. The light beams received by each of the input optical channels IL1–IL4 of the integrated multimode optical coupler OC are carried along the length of the input optical channel IL* to a juncture comprising optical combiner C where the plurality of input optical channels IL1–IL4 are joined together to form a single output optical channel OL1, which output optical channel OL1 is a single physically constrained optical path. The juncture located in the optical combiner C gradually reduces the distances between the input optical channels IL1–IL4 and finally combines these channels into one channel of the same dimension as the output optical channel OL1.

Light that is transmitted down an optical channel, which comprises either an optical fiber OD or one of the optical channels IL1–IL4, OL1 of the preferred embodiment of the present invention, suffers a loss in intensity that is a function of the length of the optical path as well as the presence of any changes in the path. Therefore, minimizing the amount of redirection of the light in the optical path and using large radius of curvature enhances the optical transmissivity of the integrated multimode optical coupler OC. In many applications, the optical transmission characteristics of the plurality of optical channels should optimally be uniform so that there is no disparity in the magnitude of the various intensities of light received at the output optical channel. Alternatively, it may be desirable to introduce a precisely controlled amount of loss into one or more of the optical channels to compensate for variations in the intensity of the light beam that are produced by the plurality of light emitting devices or to account for a requirement in the combined light output produced at the output optical channel. As can be seen from the implementation of the preferred embodiment of the invention illustrated in FIG. 1A, the curvature of the plurality of input optical channels IL1–IL4 is minimized and maintained fairly uniform across the plurality of input optical channels IL1–L4. The radius of curvature of the input optical channels IL1–L4 is maintained large and typically is on the order of 10 millimeters.

FIG. 1C illustrates a cross-section (not to scale) of the input optical channels IL1–IL4 and shows the substantially rectangular configuration thereof, which configuration supports multiple modes of excitation of the light as it is transmitted along the length of the input optical channels IL1–IL4 from the first end to the second end. The width of the optical channels is precisely controlled by the design of the mask used to fabricate the optical channels while the depth of the optical channels is roughly controlled during processing. As can be seen from FIG. 1C, the cross-section of the optical channels is not precisely rectangular due to the physics of the fabrication process. Instead, the ions used to fabricate the optical channels migrate in a manner to create curved boundaries within the optical channels.

The optical channels typically support at least 2–3 modes of operation in a vertical direction while numerous modes exist in the horizontal direction. The depth of the waveguide formed by the optical channels is typically 10–20 μm, while the horizontal dimension is selected to be much larger than the beam size emanating from the light source. The characteristics of the output beam of light for a light emitting device is a function of the device selected to implement the light emitting device. The light beam produced is typically 1 micron by 10 microns in dimensions for an edge emitting laser diode light emitting device while the input optical channel would typically be 15 microns by 50 microns in dimensions. Furthermore, the optical coupler OC is totally passive, requiring no energy input to operate.

As can also be seen from FIG. 1A, the interconnection of the second end of the plurality of input optical channels IL1–IL4 is achieved in a manner to avoid loss of light intensity. The transitions between the input optical channels IL1–IL4 and optical combiner C are accomplished in a manner to maintain large radius of curvature in the light path. The specific implementation of the interconnection junctions in optical combiner C is a function of the number of optical channels, the wavelengths selected for the light emitting devices L1–L4 as well as the physical dimensions of the optical channels both on the input side and the output side. Suffice it to say that gradual transitions and the elimination of any loss of light due to mode volume reduction are primary design considerations in implementing the optical combiner C in the integrated multimode optical coupler OC. As the plurality of light beams traverse their respective input optical channels IL1–IL4, and pass through the optical combiner C, these light beams are carried by the output optical channel OL1 from a first end thereof which is present at the optical combiner C to a second end thereof at which the light beams exit the integrated multimode optical coupler OC via a butt-joined interface with another optical transmission media. The butt coupling is shown in FIG. 1A wherein an optical fiber OD of optical cross-section and numerical aperture consistent with those of the output optical channel OL1 is juxtaposed to the output optical channel OL1 of the integrated multimode optical coupler OC in a manner to obviate the need for a lens and in a similar mechanical configuration as used for the input side of the integrated multimode optical coupler OC. Due to the funneling capability of the optical combiner C in the integrated multimode optical coupler OC, the dimensions of the output optical channel OL1 can in many instances correspond to the sum of the optical dimensions of the input optical channels IL1–IL4. Thus, the integrated multimode optical coupler OC represents a single unitary structure that functions to interconnect a plurality of light beams with a single output optical channel OL1. This arrangement eliminates the need for connectors, complex mechanical assemblies and yet produces output optical intensity values that are significantly greater than obtainable with prior art apparatus.

Optical Transmissivity Characteristics

Figure 3:
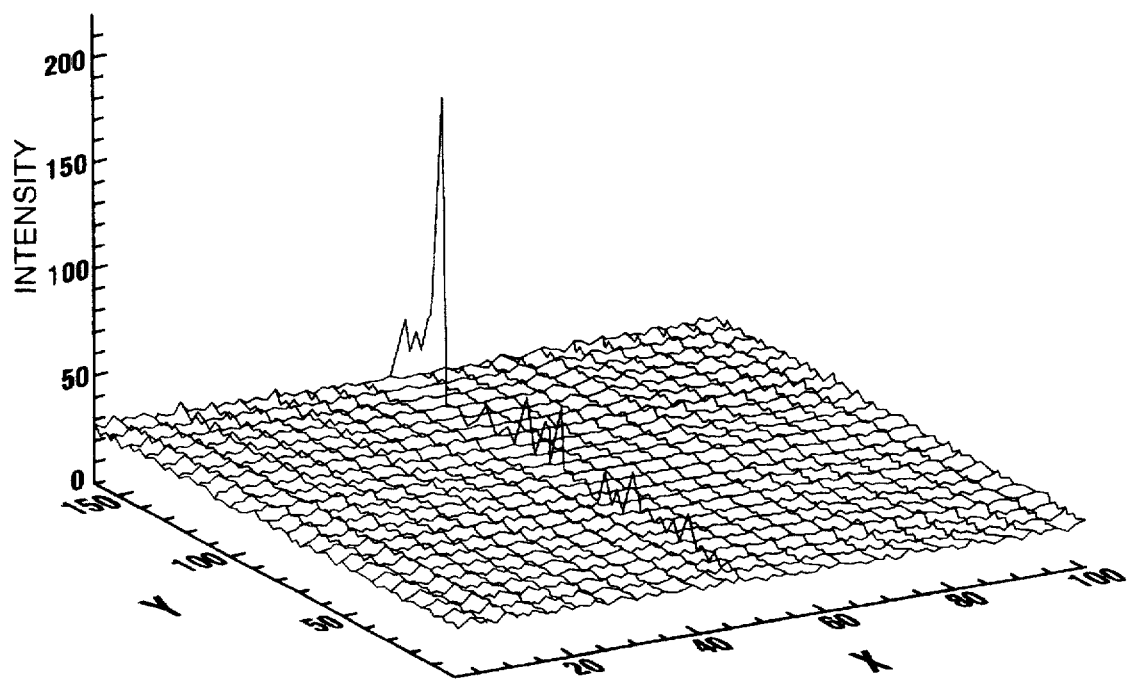
FIG. 3 illustrates an output beam profile of the preferred embodiment of the integrated multimode optical coupler of the present invention.
Figure 4:
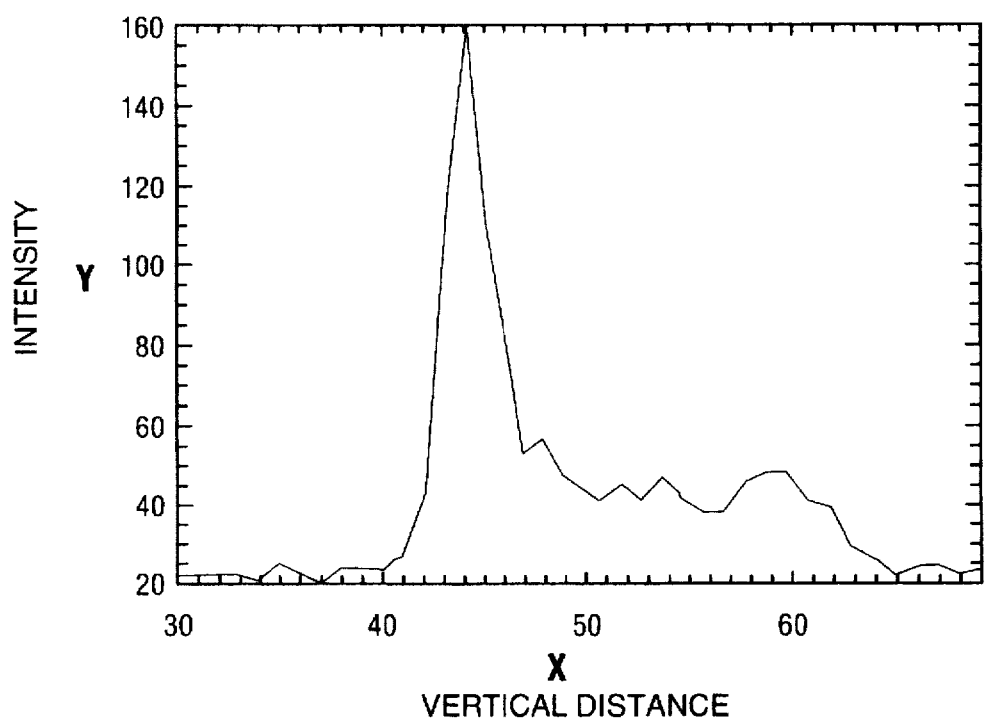
FIG. 4 illustrates a vertical output beam profile of the preferred embodiment of the integrated multimode optical coupler of the present invention.

FIGS. 3 and 4 illustrate charts of the optical transmissivity characteristics of the integrated multimode optical coupler OC of the preferred embodiment of the present invention. FIG. 3 is a plot of the light intensity as measured at the substrate face OE where the output optical channel OL1 exits substrate S. As can be seen from this plot, there is a narrowly defined locus at which the majority of the light beam intensity is output from the output optical channel OL1. In addition, FIG. 4 is a plot in the vertical direction of the output optical intensity as measured at the substrate face OE where the output optical channel OL1 exits substrate S. As can be seen from this plot, there is a narrowly defined locus at which the majority of the light beam intensity is output from the output optical channel OL1.

The major technical challenge in this design of the integrated multimode optical coupler OC is to increase the overall delivery of the light power from the light emitting devices L1–L4 to the optical fiber OD through the integrated multimode optical coupler OC. There are three sections of the integrated multimode optical coupler OC which must be considered: the coupling between the light emitting devices L1–L4 and the integrated multimode optical coupler OC; the loss in the integrated multimode optical coupler OC; and the coupling between the integrated multimode optical coupler OC and the optical fiber OD. Conflicting considerations are frequently encountered in the design of a specific embodiment of the integrated multimode optical coupler OC and trade-offs are typically necessary.

Coupling Between the Light Emitting Devices and the Optical Channels

Two characteristics of the input optical channels IL1–IL4 determine the coupling efficiency: the physical size of the cross section of the input optical channel IL1–IL4 and the acceptance angle, also termed the numerical aperture. The size of the input optical channel IL1–IL4 should be large enough to intercept most of the light beam which impinges on the input optical channel IL1–IL4. The light emitting devices L1–L4 are typically placed very close to the integrated multimode optical coupler OC (nearly touching) and the beam size can be considered to be substantially the same as the light emitting area on the light emitting devices L1–L4. The typical light emitting area on an edge emitting laser diode is 1×10 µm and the light beam produced is elliptical in cross-section. However, the beam divergence is usually large: on the order of 30° off the normal on the large angle of the ellipse. In cases where the distance between the light emitting devices L1–L4 and the integrated multimode optical coupler OC is more than even a few micrometers, the actual beam size on the integrated multimode optical coupler OC has to be estimated. The integrated multimode optical coupler OC is a device that can only accept light within a predetermined acceptance angle of θ. This property of the integrated multimode optical coupler OC is more commonly described by the variable termed numerical aperture (NA), where NA=sin(θ/2). This acceptance angle must also intercept most of the power distributed in the beam divergence angle. The numerical aperture of the integrated multimode optical coupler OC is determined by the refractive index difference between the integrated multimode optical coupler OC and its surrounding material, the substrate or air, with $$NA = \sqrt{(n_1^2 - n_2^2)}$$

where $n_1$ is the refractive index of the integrated multimode optical coupler OC and $n_2$ is the refractive index of the surrounding material. Since the surrounding material is predetermined and immutable, the way to increase the numerical aperture is to increase the refractive index of the optical channels, which demands a higher concentration of silver ions in the optical channels. For buried waveguide applications, the numerical aperture in all four directions is the same because the four sides of the optical channels are surrounded by the substrate. In the case of the unburied waveguide, the numerical aperture of the optical channel in the upper direction, at the surface of the substrate where the surrounding material is air or the ambient atmosphere, has a larger numerical aperture than in the other three directions because of a larger index difference. Where a laser diode is used as the source, the waveguide numerical aperture should be at least 0.3, preferably 0.35, to achieve a coupling efficiency of about 80% or more and the input end face of the optical channel should be finely polished to reduce scattering loss in coupling.

Loss In the Optical Channel

There are material losses due to absorption, scattering and waveguide bending loss. Material absorption is estimated to be less than 0.1 dB/cm and can be ignored. Scattering loss depends on the concentration of the silver ions. It is in conflict with the need to get a larger numerical aperture. Scattering is more related to the manufacturing process, in that an uneven distribution of the silver ions, and/or roughness at the waveguide boundaries and/or scratches at the waveguide surface cause much larger scattering than pure Rayleigh scattering. Both absorption loss and scattering loss are length dependent, expressed usually in terms of dB/cm. It is therefore very important to reduce the total length of the optical channels.

Because we are merging four input optical channels into one output optical channel, the four input optical channels are bent to some extent. This causes part of the mode power to be radiated out of the waveguide. It is estimated that in a single mode waveguide, the fundamental mode suffers about 0.1 dB loss for a radius of curvature of 1 cm. In the case of multimode waveguides, it is difficult to estimate the bending loss of higher order modes and hence total bending loss. The general rule for a qualitative estimation is that the highest order modes suffer more loss than the lower order modes, which lie well within the boundary of the waveguide. Waveguides with two or three modes have very high bending loss because the proportion of high loss modes is high. Increasing the mode volume decreases the proportion of high loss modes and hence the bending loss. When many modes (hundreds, for example) are present, they approximate a mode continuum. If the light power is evenly distributed among all these modes, geometry optics can be used to estimate the bending loss, given by:

$$L = 100\ [w/r][1/NA^2 - 1]\%$$

where L is loss in percentage, NA is the waveguide numerical aperture, w is the width of the optical channel, r is the radius of curvature of the bending curve.

In a real waveguide, modal power distribution is usually uneven and the true bending loss differs from this estimation and from case to case. The above-noted equation points the way to reduce bending loss. Increasing the waveguide numerical aperture and the bending radius curvature and reducing optical channel width reduces the bending loss. Some trade-offs are required. First, the mode volume in the optical channel is proportional to the product of numerical aperture and optical channel width. Reducing the optical channel width decreases the number of modes in the waveguide, which may alter the applicability of the above-noted equation and could increase total loss. Increasing the numerical aperture is advantageous, which is also in line with increasing the optical channel-light source coupling efficiency but in conflict with decreasing scattering loss.

Larger radius of bending curvature results in less bending loss but increases the total length of the optical channel and thus the material loss. Another possible loss relates to the configuration of the optical channel, which is mode volume reduction loss. The mode volume supported by a waveguide is related to the waveguide numerical aperture, and optical channel width, with any variation of these two parameters in the optical channel in the direction of reducing the mode volume results in the loss of modes and thus light power. As a rule, the width of the optical channel or the sum of the widths of optical channels should be kept the same or become larger along the light propagation direction.

Optical Channel to Fiber Coupling

As noted above with respect to the input optical channels, the size and numerical aperture of the optical fiber should also match or be larger than those of the output optical channel to minimize the coupling loss. The waveguide numerical aperture of the output optical channel should be made no greater than the optical fiber numerical aperture, which is 0.37 for the optical fibers presently in use. Again, the end faces of the output optical channel and the optical fiber should be well polished to reduce scattering.

Burled Optical Channel

Loss in a straight optical channel is due to scattering, absorption and surface losses caused by surface imperfections while the absorption is determined by the material characteristics. In addition, surface roughness on the glass-air surface, where the optical channels abut the surface of substrate S, can cause large losses since the highest index region of the optical channel is next to the air surface. These losses can be reduced by burying the optical channel as noted above.

Application to Photoplethysmographic Systems

Figure 2A:
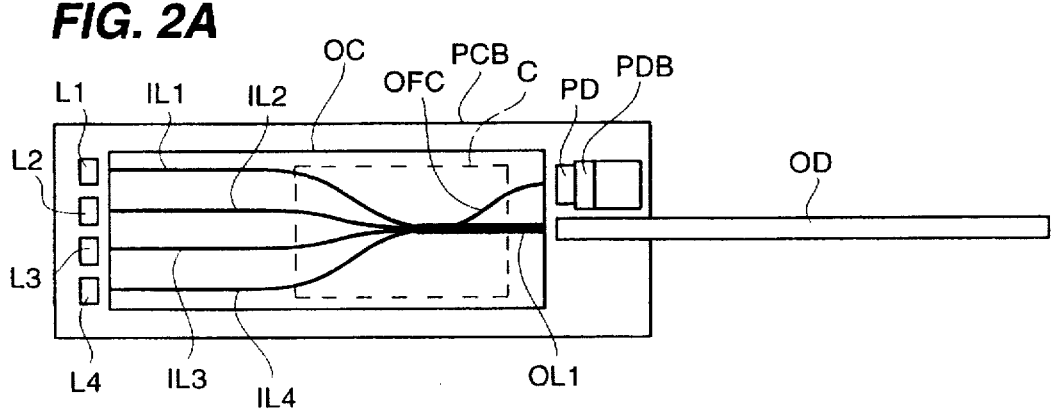
FIGS. 2A and 2B illustrate a top plan view and a side view, respectively of an alternative embodiment of the integrated multimode optical coupler of the present invention.
Figure 13:
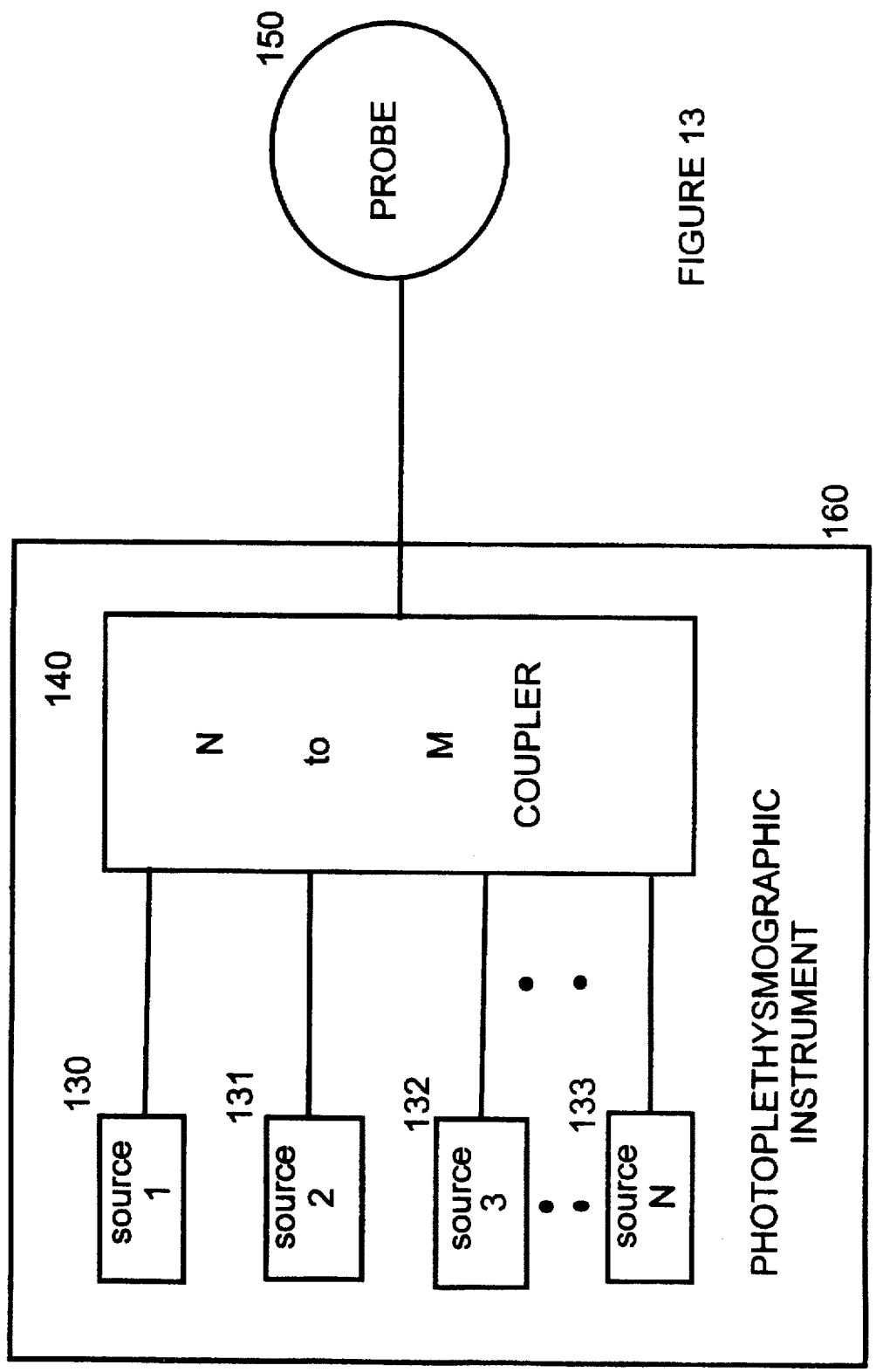
FIG. 13 illustrate a photoplethysmographic instrument.

The present invention is directed to the use of the integrated multimode coupling apparatus as set forth herein in a photoplethysmographic device. In particular, a pulse oximeter instrument uses photoplethysmographic techniques to measure the oxygen content of the pulsatile component of the arterial blood of a subject. The conventional pulse oximeter instrument places two light sources, usually light emitting diodes, in the probe, such that the light sources are placed in contact with the tissue under test. In the presently described photoplethysmographic instrument 160, as shown in FIG. 13, a plurality of N light sources 131, 132, 133 and 134 which are each capable of generating abeam of light are placed in the instrument and not in the probe 150. In the instrument, there is a need to combine the output signals (light beams) produced by the two or more light sources into a single light beam which is directed to the tissue under test. The hereindescribed N to M optical coupler 140 is used to combine the plurality of light sources 131, 132, 133, and 134 into one or more optical transmission channels 145 for transmission to probe 150 where the beam of light is applied to the tissue under test. The integrated multimode optical coupling apparatus of the present invention, as shown in FIGS. 1A and 2A, allows the light from four light sources, i.e., N=4, to be directed into a single output optical fiber cable, bundle or light guide. Thus, the waveguide performs the function of wavelength division multiplexing. The light sources of the photoplethysmographic instrument 131, 132, 133 and 134 are equivalent to L1, L2, L3 and L4 of the general optical waveguide system of FIGS. 1A and 2A and coupler 140 is depicted as C in FIGS. 1A and 2A. Thus, light sources 131, 132, 133 and 134 must be placed so that the output light from each is transmitted into the input optical channels such as IL1, IL2, IL3 and IL4 of FIG. 1 where the channels are interconnected to form at least one output transmission channel 145. The output transmission channel than directs the light to the tissue under test onto which probe 150 is attached in a well-known manner.

Alternative Embodiments

Alternative embodiments of the invention are illustrated in schematic form in FIGS. 5–12 wherein, instead of the N-to-1 coupling illustrated in FIG. 1, an N-to-M coupling is implemented by the structures of FIGS. 5–12. The fundamental architecture of these alternative embodiments is substantially the same as the preferred embodiment, with the difference being that instead of a single output optical channel, a plurality of output optical channels are used. To achieve this N-to-M coupling, the merging of the input optical channels into the optical combiner C is mapped on the output side by the merging of M output optical channels into the optical combiner C in a manner that corresponds to the design of the input merging. Thus, the plurality of light beams obtained from the plurality of input optical channels IL1–IL4 are merged together in the optical combiner C and then divided among the plurality of output optical channels OL1–OL2 in a manner that is inverse of their joining at the input optical channel/optical combiner interface. The joining of a plurality of output optical channels OL1–OL2 with the optical combiner C can be controllably managed such that the intensity of the light transmitted from the optical combiner C to each of the output optical channels OL1–OL2 varies so that a greater portion of the light is transmitted to one of the output optical channels than another. Again, the specific implementation of this interface is subject to the creativity of the designer and the constraints imposed by the wavelengths selected and the dimensions required for the optical channels.

Figure 5:
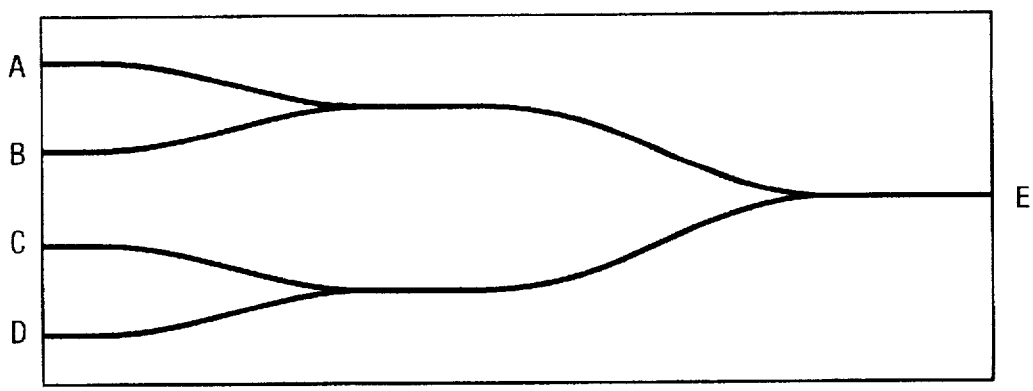
FIGS. 5–12 illustrate in schematic form, alternative embodiments of the integrated multimode optical coupler of the present invention.
Figure 6:
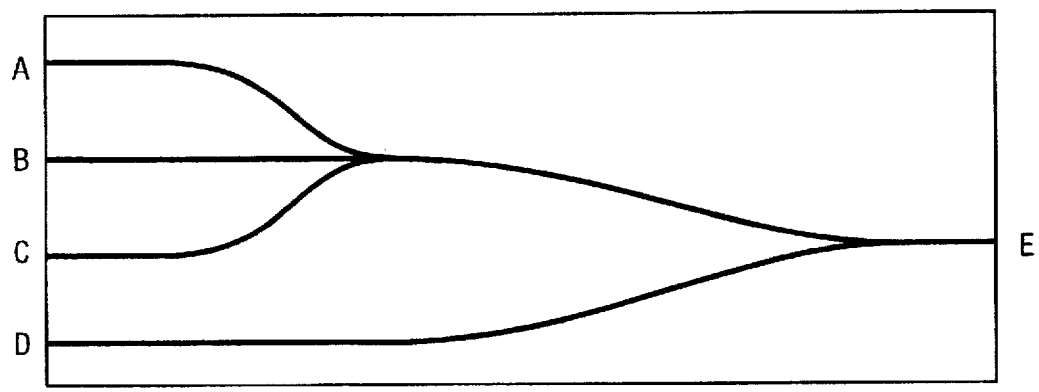
Figure 7:
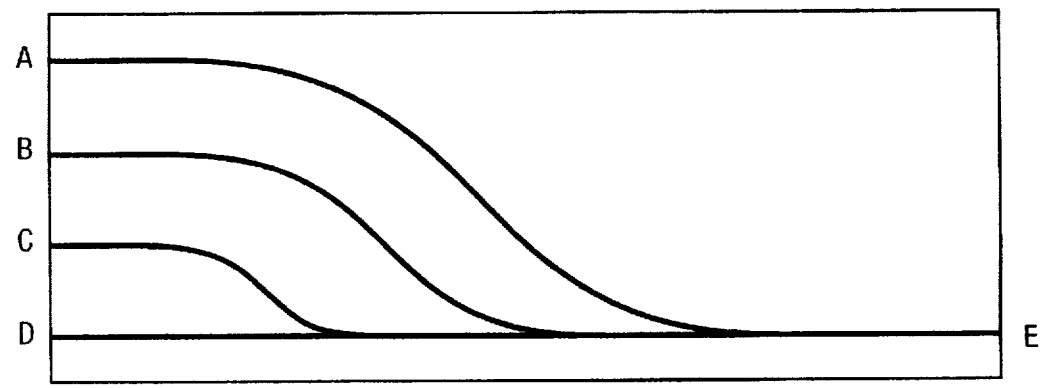
Figure 8:
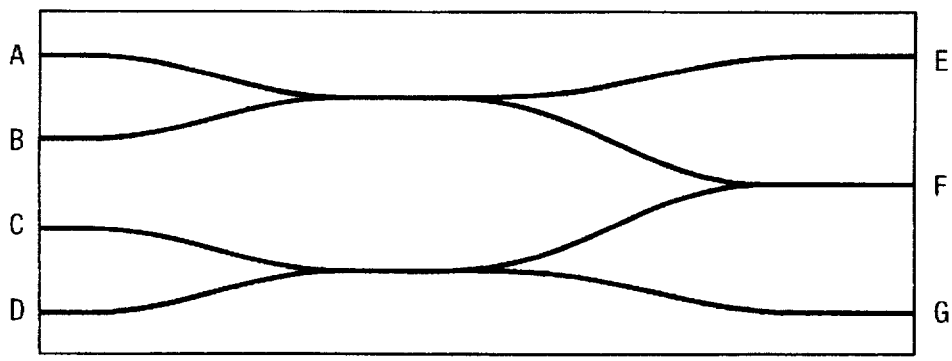
Figure 9:
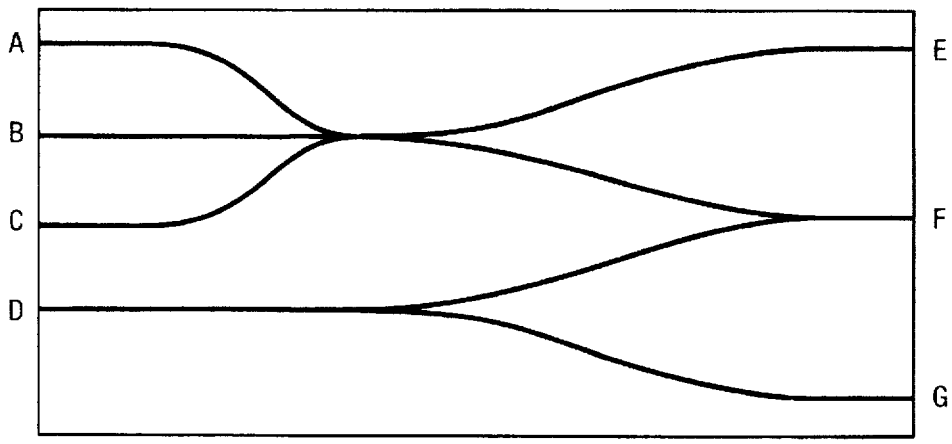
Figure 10:
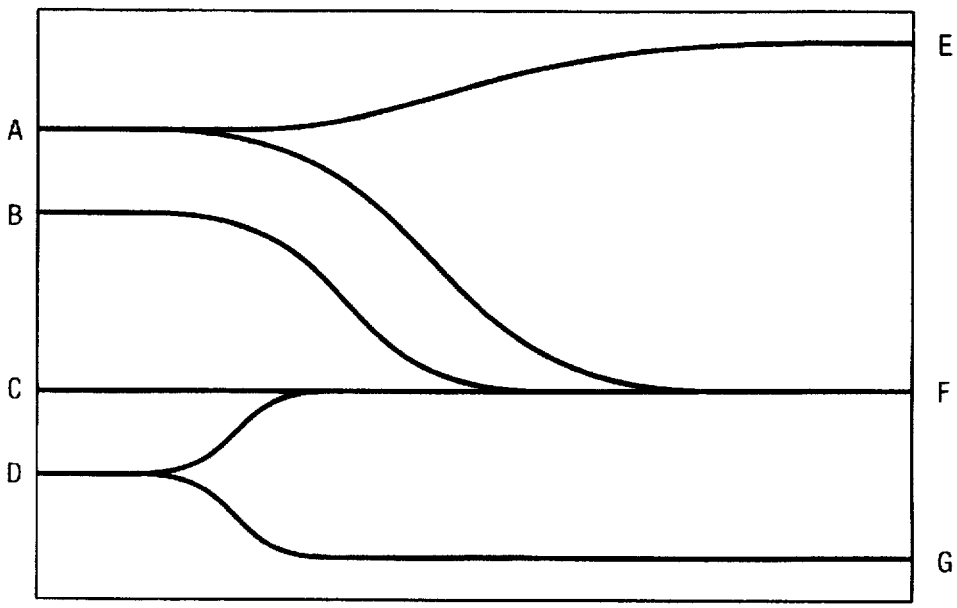
Figure 11:
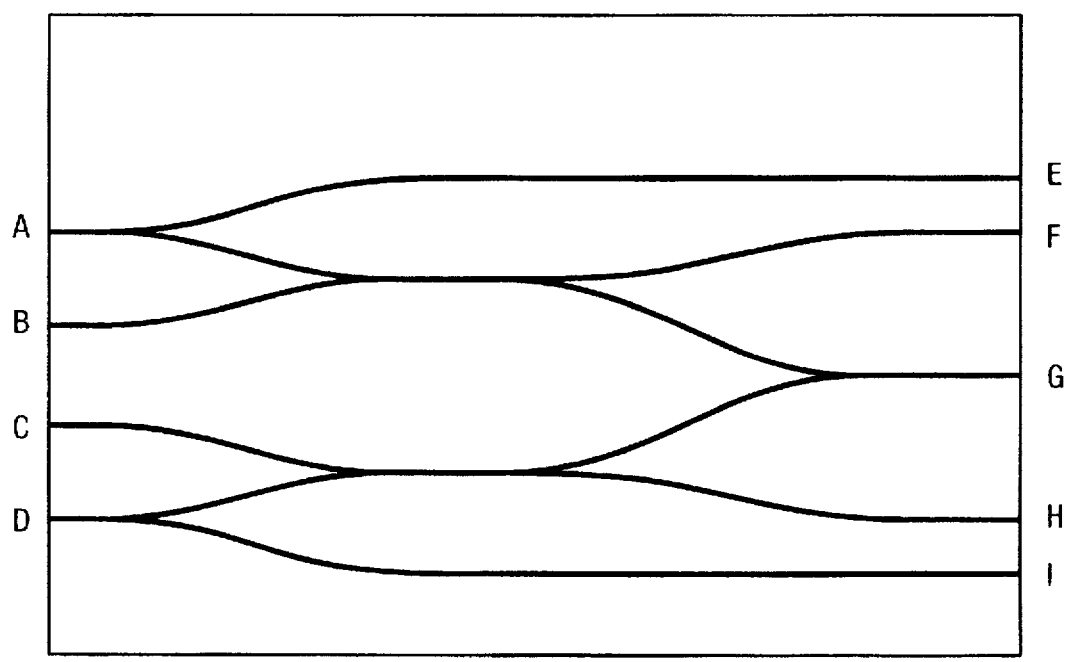
Figure 12:
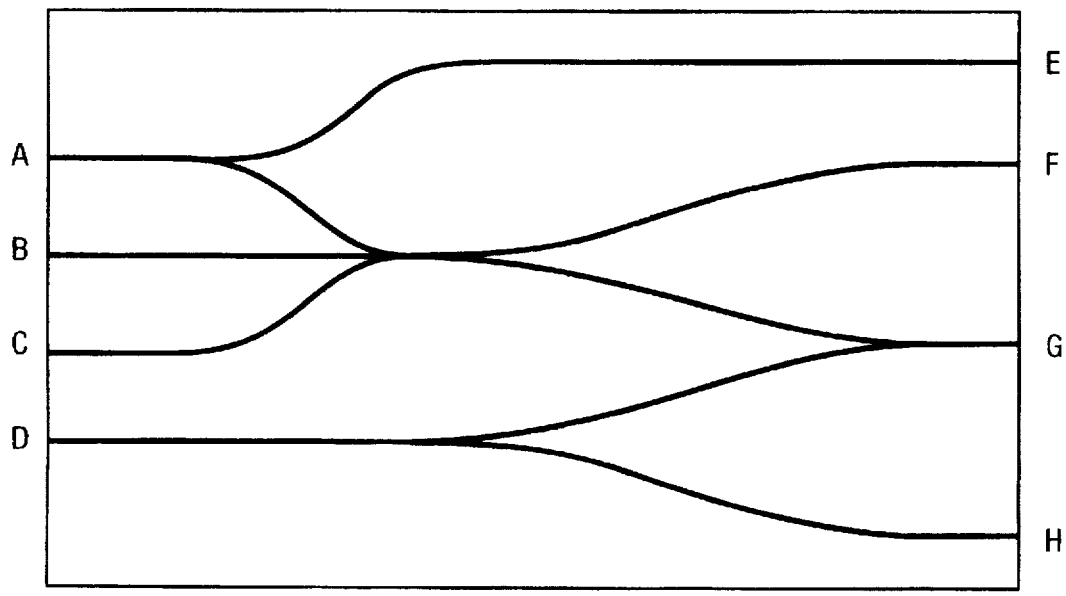

The various embodiments disclosed in FIGS. 5–12 are not to scale and are used to illustrate that the combining of input optical channels does not have to be effected at a single locus, but can be implemented in distributed fashion. Furthermore, the combining of both input and output optical channels enables the designer to perform a logical combination of the input optical light beams to form various combinations of these light beams for the one or more output optical channels. For example, the integrated multimode optical coupler of FIG. 5 provides for the combination of inputs designated A and B, as well as the combination of inputs designated C and D, then combines the resultant signals to provide a single light output wherein E=A+B+C+D. A slightly different implementation of the integrated multimode optical coupler is shown in FIG. 6 wherein the combination of inputs designated A and B and C is effected prior to the addition of the input designated D to provide a single light output, wherein E=A+B+C+D. FIG. 7 illustrates yet another variation of the integrated multimode optical coupler to provide a single light output wherein E=A+B+C+D. The combination of inputs designated A and B is first effected, then input C is added to the result, followed by the addition of the final input, D. FIGS. 8–12 illustrate N to M integrated multimode optical coupler configurations. In FIG. 8, the integrated multimode optical coupler provides for the combination of inputs designated A and B, as well as the combination of inputs designated C and D, then combines the resultant signals to provide a single light output wherein F=A+B+C+D. However, the output E represents the combination E=A+B, while the output G represents the combination G=C+D. Thus, the three outputs represent various logical combinations of the input signals. Similarly, in FIG. 9, the integrated multimode optical coupler provides for the combination of inputs designated A and B and C, then combines the resultant signal with input D to provide a single light output wherein F=A+B+C+D. However, the output E represents the combination E=A+B+C, while the output G represents the direct transmission of the input channel D, or G=D. A variation of the integrated multimode optical coupler of FIG. 9 is illustrated in FIG. 10, wherein the integrated multimode optical coupler provides for the combination of inputs designated C and D, then combines the resultant waveguide channel with input B, then combines the resultant signal with input A to provide a single light output wherein F=A+B+C+D. However, the output E represents the direct transmission of the input channel A, or E=A, while the output G represents the direct transmission of the input channel D, or G=D. Finally, FIGS. 11 and 12 represent various complex combinations to produce multiple outputs. For example, the integrated multimode optical coupler of FIG. 11 is a symmetrically configured device which combines the inputs A, B, C, D to produce E=A, F=A+B, G=A+B+C+D, H=C+D, I=D. FIG. 12 illustrated the combination of inputs A, B, C, D to produce outputs E=A, F=A+B+C, G=A+B+C+D, H=D. It is obvious that there are numerous logical combinations of inputs which can be produced using the structure of the integrated multimode optical coupler of the present invention.

Light Intensity Monitor

Figure 2B:
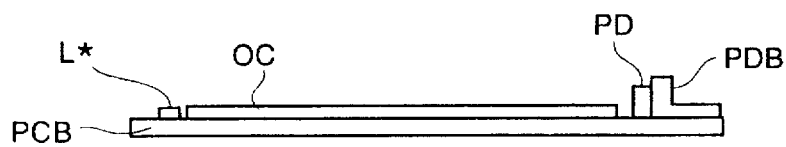

The integrated multimode optical coupler OC can be used to obviate the need for the integral photo diode noted above. The photo diode is absent from the laser diodes shown in FIG. 2A, which laser diodes can then be implemented to have virtually no output from the rear facet of the laser cavity. (The illustration of FIG. 2B has the output optical fiber OD absent therefrom in the interest of clarity of illustration.) The reflectivity of the rear facet is increased, thereby increasing the efficiency of the laser diode, which increases the power output in the forward direction from the front facet of the laser cavity. The light intensity of the light output by the laser diodes is monitored at a common node by the use of a single photo diode PD. This is accomplished by fabricating an additional output optical channel OFC in the integrated multimode optical coupler OC, which additional optical channel OFC is parallel to the main output optical channel OC1. The additional output optical channel OFC has an output which is directed toward a photo diode PD mounted on an L-shaped bracket PDB, which is placed at the output of the optical channel OFC. The photo diode PD can be very small and considerably faster than the photo diode illustrated in FIG. 1A since the light beam incident on the photo diode PD is very small in optical cross-section. The four laser diodes L1-L4 illustrated are typically time multiplexed and the photo diode PD therefore has to only detect the intensity of a single wavelength at a time.

Fabrication Process

Integrated multimode optical coupler OC is manufactured by means of forming the optical channels on a substrate S in a manner that is well known in the integrated optics technology. In particular, a glass based substrate S is preferably used as the base element and the various optical channels and optical combiner C are formed in the substrate S itself. This is accomplished by the deposition of a mask on one major surface of the substrate S to thereby enable the selective formation of the optical channels. Once the mask has been deposited, the resultant subassembly is placed in a fabrication system so that ions of selected material and concentration can be migrated into the glass substrate to displace the sodium ions that are contained therein. The use of these other ions cause the optical transmission characteristics of the glass substrate S to change such that the ion deposited region has a greater optical refractive index than the surrounding substrate S. The optical channels formed in the substrate S are of uniform depth as shown in cross-section view in FIG. 1C. The optical channels can also be buried by driving the ions deeper into substrate S during the fabrication process and then depositing a layer of the original sodium ions to cap the optical channels to thereby bury the optical channels within the substrate S.

The process used to fabricate the integrated multimode optical coupler device comprises the following steps:

(a) Evaporate a film of aluminum onto the substrate.

(b) Spin a layer of photoresist on top of the deposited aluminum layer.

(c) Place the master mask on top of the photoresist layer and make the waveguide pattern on the photoresist layer by photolithography.

(d) Develop photoresist to remove the exposed part of the photoresist which is the defined waveguide pattern.

(e) Etch off the aluminum layer corresponding to the exposed photoresist areas which correspond to the waveguide pattern.

(f) Remove the remaining photoresist layer.

(g) Melt $AgNO_3$ or $AgNO_3/NaNO_2$ at above 215° C. in a crucible and dip the samples in the melt for silver-sodium ion exchange for a predetermined time (from 10 minutes to several hours depending on the waveguide characteristics). Silver ions diffuse into the waveguide pattern areas of the substrate, replacing the sodium ions to increase the refractive index and thereby form the waveguide. Using $AgNO_3/NaNO_2$ reduces the concentration of $Ag^+$ ions and requires longer diffusion time, but it makes it easier to control for reproduction.

(h) Anneal the sample at above 215° C. to further diffuse the silver ions to make the waveguide deeper and reduce the silver concentration in the waveguide to the proper levels.

(I) Place the sample in molten $NaNO_2$ and diffuse $Na^+$ back into the waveguide to replace part of the $Ag^+$ ions to reduce this concentration near the glass-air surface and form a buried waveguide.

(j)) Remove the remaining aluminum by etching.

(k) Cut the substrate to produce the desired size waveguide.

(l) Polish the cut edges to smooth the waveguide ends.

(m) Clean sample with acetone and methanol.

(n) Test sample.

Summary

The integrated multimode optical coupling apparatus comprises an N-to-M optical coupling arrangement that is simple to manufacture, minimizes optical losses and is significantly less expensive than the prior art arrangements of coupling optical signals. A plurality of optical channels is formed in the substrate to join N input optical channels with M output optical channels. This integrated optical coupler is formed by diffusing silver ions or other equivalent ions into the glass substrate in these defined areas to form optical channels of high optical refractive index in the body of the substrate.

We claim:

1. A passive optical coupler apparatus for interconnecting light beams output by a first plurality of light sources with at least one output optical device comprising:

a substrate;

an optical combiner formed in said substrate;

a plurality of optically transmissive input optical channels formed in said substrate, each of said input optical channels having a first end located at a surface of said substrate and a second end terminated in said optical combiner;

at least one optically transmissive output optical channel formed in said substrate, each of said output optical channels having a first end located at a surface of said substrate and a second end terminated in said optical combiner;

at least one output monitor optical channel having a first end located at a surface of said substrate and a second end terminated in said optical combiner for transmitting a predetermined proportion of light received by said optical combiner to said first end of said output monitor optical channel; and wherein said optical combiner optically interconnects said second ends of said plurality of input optical channels with said second ends of said at least one output optical channel and said second end of said output monitor optical channel to enable light beams transmitted by selected ones of said plurality of input optical channels to enter selected ones of said second ends of said at least one output optical channel and said second end of said output monitor optical channel for transmission to said first ends thereof.

2. The apparatus of claim 1 wherein said optical combiner comprises a region of said substrate which joins selected ones of said input optical channels together and with selected ones of said at least one output optical channel.

3. The apparatus of claim 1 further comprising:

a plurality of light emitting devices, each one of which is located juxtaposed to a first end of a corresponding one of said plurality of input optical channels.

4. The apparatus of claim 1 further comprising:

at least one optical fiber each of which is located juxtaposed to a first end of a corresponding one of said at least one output optical channel.

5. The apparatus of claim 1 further comprising:

a photodiode located juxtaposed to said first end of said at least one output monitor optical channel to generate a signal indicative of the intensity of light produced by said plurality of light sources, as represented by said predetermined proportion of light received by said optical combiner and transmitted through said at least one output monitor optical channel.

6. The apparatus of claim 1 wherein said optical combiner comprises a region of said substrate which joins all of said plurality of input optical channels into a single output optical channel.

7. A photoplethysmographic instrument which produces a plurality of beams of light for application to a subject under test, comprising:

a plurality of light sources, each of which is capable of generating a beam of light;

a probe for applying said generated beams of light to a subject under test;

passive optical coupler apparatus for interconnecting light beams output by said plurality of light sources with at least one probe optical transmission channel which transmits said beams of light to said probe, comprising:

a substrate;

an optical combiner formed in said substrate;

a plurality of optically transmissive input optical channels formed in said substrate, each of said input optical channels having a first end located at a surface of said substrate and a second end terminated in said optical combiner;

at least one optically transmissive output optical channel formed in said substrate, each of said output optical channels having a first end located at a surface of said substrate and a second end terminated in said optical combiner; and wherein said optical combiner optically interconnects said second ends of said plurality of input optical channels with said second ends of said at least one output optical channel to enable light beams transmitted by selected ones of said plurality of input optical channels to enter selected ones of said second ends of said at least one output optical channel for transmission to said first ends thereof for coupling to said probe optical transmission channel.

8. The apparatus of claim 7 wherein said optical combiner comprises a region of said substrate which joins selected ones of said input optical channels together and with selected ones of said at least one output optical channel.

9. The apparatus of claim 7 wherein said plurality of light emitting devices are each located juxtaposed to a first end of a corresponding one of said plurality of input optical channels and said probe transmission optical channel is located juxtaposed to a first end of a corresponding one of said at least one output optical channel.

10. The apparatus of claim 7 wherein said optical combiner comprises a region of said substrate which joins all of said plurality of input optical channels into a single output optical channel.

* * * * *